US012584866B1

(12) United States Patent
Noh et al.

(10) Patent No.: US 12,584,866 B1
(45) Date of Patent: Mar. 24, 2026

(54) MEASUREMENT SYSTEM WITH DETECTION MECHANISM AND METHOD OF OPERATION THEREOF

(71) Applicant: Park Systems Corp., Suwon (KR)

(72) Inventors: Hanaul Noh, Mountain View, CA (US); Chih-Chieh Hsieh, San Jose, CA (US); Myunghoon Choi, Santa Clara, CA (US); Stefan Kaemmer, Santa Barbara, CA (US)

(73) Assignee: Park Systems Corp., Suwon (KR)

( * ) Notice: Subject to any disclaimer, the term of this patent is extended or adjusted under 35 U.S.C. 154(b) by 0 days.

(21) Appl. No.: 19/384,839

(22) Filed: Nov. 10, 2025

(51) Int. Cl.
G01N 22/00 (2006.01)
G01Q 60/38 (2010.01)

(52) U.S. Cl.
CPC ............. *G01N 22/00* (2013.01); *G01Q 60/38* (2013.01)

(58) Field of Classification Search
CPC ...................................................... G01N 22/00
See application file for complete search history.

(56) References Cited

U.S. PATENT DOCUMENTS

| | | | |
|---|---|---|---|
| 8,266,718 B2 | 9/2012 | Lai et al. | |
| 8,307,461 B2 | 11/2012 | Li et al. | |
| 8,661,560 B1 | 2/2014 | Li et al. | |
| 9,213,047 B2 | 12/2015 | Li et al. | |
| 9,291,640 B2 | 3/2016 | Su et al. | |
| 9,322,842 B2 | 4/2016 | Hu et al. | |
| 10,060,862 B2 | 8/2018 | Cui et al. | |
| 10,228,388 B2 | 3/2019 | Prater et al. | |
| 10,274,513 B2 | 4/2019 | Friedman et al. | |
| 10,473,694 B2 | 11/2019 | Friedman et al. | |
| 2012/0192319 A1 | 7/2012 | Li et al. | |
| 2013/0276174 A1 | 10/2013 | Li et al. | |
| 2014/0230103 A1 | 8/2014 | Su et al. | |
| 2014/0283229 A1 | 9/2014 | Hu et al. | |
| 2015/0051505 A1* | 2/2015 | Rossi ..................... A61B 5/053 |
| | | | 29/595 |
| 2017/0299525 A1 | 10/2017 | Cui et al. | |

(Continued)

FOREIGN PATENT DOCUMENTS

CN        111189855 A  *  5/2020   ............. G01N 22/00

OTHER PUBLICATIONS

Jun-Yi Shan, Nathaniel Morrison, Su-Di Chen, Feng Wang, Eric Y. Ma, Johnson-noise-limited cancellation-free microwave impedance microscopy with monolithic silicon cantilever probes; pp. 1-8; Nature Communications, Published online Jun. 13, 2024; © The Author(s) 2024; https://doi.org/10.1038/s41467-024-49405-8.

(Continued)

*Primary Examiner* — Alesa Allgood
(74) *Attorney, Agent, or Firm* — Perspectives Law Group, Corp.

(57)        ABSTRACT

A method of operation of a measurement system includes: generating a microwave excitation to a sample; capturing a microwave response from the sample based on the microwave excitation; generating a baseband voltage based on the microwave response; determining a sense voltage based on the baseband voltage; generating an amplifier output voltage based on the sense voltage; and generating a channel output voltage based on the amplifier output voltage in a frequency range from a direct-current (DC) value to a predefined frequency value for characterizing the sample.

20 Claims, 6 Drawing Sheets

(56)     References Cited

U.S. PATENT DOCUMENTS

| | | | |
|---|---|---|---|
| 2018/0120344 A1 | 5/2018 | Prater et al. | |
| 2018/0217181 A1 | 8/2018 | Friedman et al. | |
| 2019/0234993 A1 | 8/2019 | Friedman et al. | |
| 2025/0379351 A1 * | 12/2025 | Karimi .................. | G01N 22/04 |

OTHER PUBLICATIONS

Analog Devices; AD8429: 1 nV/√Hz Low Noise Instrumentation Amplifier, pp. 1-30; Data Sheet, Rev. A, Feb. 2017, Analog Devices, Inc., Norwood, MA, USA; © 2011-2017 Analog Devices, Inc.; D09730-0-2/17(A).

Analog Devices; ADL5380: 400 MHz to 6 GHz Quadrature Demodulator, VData Sheet, Rev. B, pp. 1-36; Dec. 2014, Analog Devices, Inc., Norwood, MA, USA; © 2009-2014 Analog Devices, Inc.; D07585-0-12/14(B).

* cited by examiner

600

MEASUREMENT SYSTEM WITH DETECTION MECHANISM AND METHOD OF OPERATION THEREOF

TECHNICAL FIELD

An embodiment of the present invention relates generally to a measurement system, and more particularly to a system with a detection mechanism.

BACKGROUND

In the field of microscopy and material characterization, atomic force microscopy (AFM) and related techniques such as Scanning Microwave Impedance Microscopy (SMIM) can be used to measure surface features and electrical responses of materials. These methods are applied in areas including semiconductor research, materials development, and biological studies to obtain information about physical and electrical characteristics of a sample.

Thus, a need still remains for a measurement system with detection mechanisms that delivers high spatial resolution together with stable, quantitative performance across multiple imaging modes and a range of materials. In view of the ever-increasing commercial competitive pressures, along with growing manufacturing needs, manufacturing expectations, and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a measurement system including: an excitation unit configured to generate a microwave excitation to a sample; a probe, coupled to the excitation unit, configured to capture a microwave response from the sample based on the microwave excitation; and an impedance detection unit, coupled to the probe, configured to: generate a baseband voltage based on the microwave response, determine a sense voltage based on the baseband voltage, generate an amplifier output voltage based on the sense voltage, and generate a channel output voltage based on the amplifier output voltage in a frequency range from a direct-current (DC) value to a predefined frequency value for characterizing the sample.

An embodiment of the present invention provides a method of operation of a measurement system including: generating a microwave excitation to a sample; capturing a microwave response from the sample based on the microwave excitation; generating a baseband voltage based on the microwave response; determining a sense voltage based on the baseband voltage; generating an amplifier output voltage based on the sense voltage; and generating a channel output voltage based on the amplifier output voltage in a frequency range from a direct-current (DC) value to a predefined frequency value for characterizing the sample.

An embodiment of the present invention provides a non-transitory computer-readable medium storing an instruction that, when executed by a control circuit of a measurement system, causes the control circuit to perform functions including: generating a microwave excitation to a sample; capturing a microwave response from the sample based on the microwave excitation; generating a baseband voltage based on the microwave response; determining a sense voltage based on the baseband voltage; generating an amplifier output voltage based on the sense voltage; and generating a channel output voltage based on the amplifier output voltage in a frequency range from a direct-current (DC) value to a predefined frequency value for characterizing the sample.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
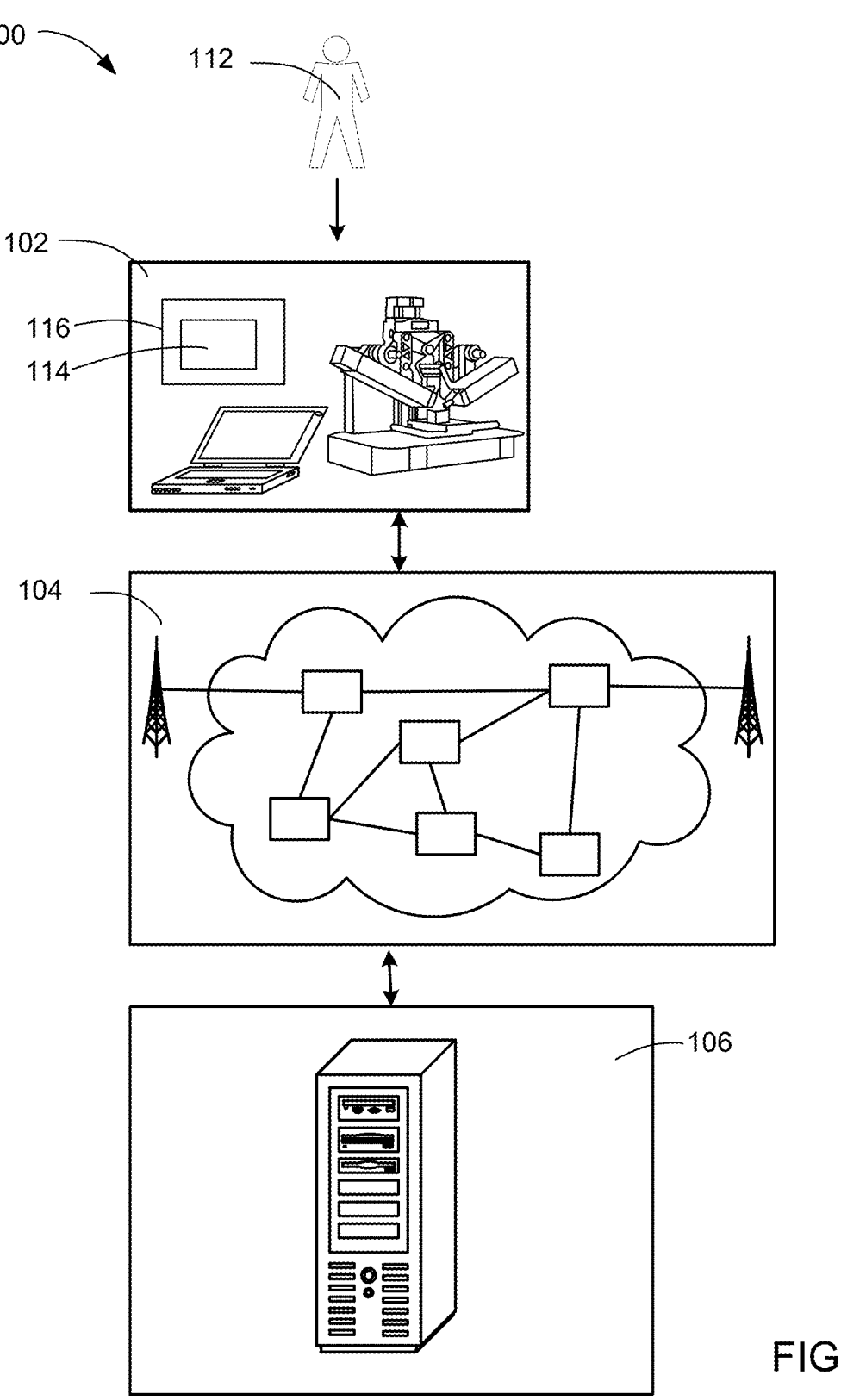
FIG. 1 is an example of a system architectural diagram of a measurement system with a detection mechanism in an embodiment of the present invention.

Description of various embodiments of the present invention is described with an example of development of an atomic force microscope (AFM) system incorporating a Scanning Microwave Impedance Microscopy (SMIM) module using a probe configured to detect both mechanical and microwave responses of a sample.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

The embodiments can be numbered as first embodiment, second embodiment, etc. or can be described without a numeric designation as a matter of descriptive convenience and are not intended to have any other significance or provide limitations for an embodiment of the present invention. The terms first, second, etc. or without a numeric designation can be used throughout as part of element names and are used as a matter of descriptive convenience and are not intended to have any other significance or provide limitations for an embodiment.

The term "module" or "unit" or "circuit" or "mechanism" referred to herein can include or be implemented as or include software running on specialized hardware, hardware, or a combination thereof in the present invention in accordance with the context in which the term is used. For example, the software can provide instructions and can be implemented as machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" or a "circuit" is written in the claims section below, the "unit" or the "circuit" is deemed to include hardware circuitry for the purposes and the scope of the claims.

For example, the hardware can include an atomic force microscope (AFM) head assembly, cantilevers or probes with conductive or metal-coated tips, piezoelectric scanners for positioning and feedback control, microwave transmission lines or coaxial feed structures for signal delivery, impedance-matching networks, microwave sources and detectors, low-noise amplifiers, mixers, and demodulators for signal processing, or a combination thereof. Also for example, the hardware can include vibration-isolation platforms, environmental enclosures, signal-conditioning circuits, controller and feedback electronics, lock-in amplifiers, data-acquisition units, or other components for AFM and Scanning Microwave Impedance Microscopy (SMIM) measurements, or a combination thereof.

As a specific example, the excitation sources can include microwave signal generators, vector network analyzers (VNAs), or frequency synthesizers configured to provide continuous-wave or modulated microwave excitations, impedance-matched through transmission lines or couplers to the probe. As another specific example, the excitation sources can include broadband microwave sources, mixers, or oscillators configured for amplitude or frequency modulation, phase control, or impedance calibration, any other microwave excitation sources, or a combination thereof.

The module, units, circuits, or mechanism in the following description of the embodiments can be coupled or attached to one another as described or as shown, as examples. The coupling or attachment can be direct or indirect without or with intervening items between coupled or attached modules or units or circuits or mechanisms. The coupling or attachment can be by physical contact or by communication between modules or units or circuits or mechanisms, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown an example of a system architectural diagram of a measurement system 100 with a detection mechanism 116 in an embodiment of the present invention. One or more embodiments address measurement functions of the measurement system 100 as a distributed platform in which exchanges of commands and data with a detection mechanism 116 across a network topology.

The measurement system 100 can include a first device 102, such as a client or a server, connected to a second device 106, such as a client or server. The first device 102 can communicate with the second device 106 through a network 104, such as a wireless or wired network.

For example, the first device 102 can be of any of a variety of computing devices, such as a measurement equipment, a computer, a notebook computer, or other multi-functional device. Also, for example, the first device 102 can be included in a device or a sub-system. As a specific example, the first device 102 can be an atomic force microscope (AFM) including a Scanning Microwave Impedance Microscopy (SMIM) module or any other scanning probe microscopy instrument.

For example, the first device 102 can function as an atomic force microscope (AFM). As an example, the first device 102 positions a probe or cantilever tip near or in contact with a sample 114, measures the interaction forces between the probe and the sample 114, and detects corresponding deflection or response signals. In an embodiment, the first device 102 includes a SMIM circuit coupled to the probe to apply a microwave excitation to the sample 114 and detect the reflected or transmitted microwave signal. Also for example, the collected signals can include mechanical response data, impedance data, or a combination thereof, which are processed to produce maps of topography, permittivity, conductivity, or other electrical or material parameters of the sample 114. As an example, data acquisition and image formation can be performed during contact or non-contact scanning modes. As another example, the second device 106 can perform impedance extraction, data reconstruction, or analysis using signal-processing algorithms, artificial intelligence (AI) models, machine-learning models, or other computational techniques For example, the user 112 supplies the sample 114 to the first device 102 with the detection mechanism 116, and the first device 102 captures response signals from the sample 114 and processes data generated from the signals. The detection mechanism 116 is an operation of driving a probe with a mechanical and microwave excitation, detecting responses corresponding to tip-sample interactions, and analyzing the detected responses to determine material and electrical information of the sample 114. As another example, the first device 102 can perform all computations locally or, via the network 104, off-load part of the computation workload or share the local computation results with the second device 106 with a higher processing capacity.

For illustrative purposes, the sample 114 is shown in the detection mechanism 116, although it is understood that the sample 114 can be outside of the detection mechanism 116. For example, the sample 114 can be mounted on a stage or chuck of the AFM or SMIM system and provided to the first device 102 to be characterized or tested.

For illustrative purposes, the detection mechanism 116 is shown in the first device 102, although it is understood that the detection mechanism 116 can be implemented in a different manner. For example, the detection mechanism 116 can be distributed between the first device 102 and the second device 106. Also for example, the first device 102 can include multiple devices that independently operate AFM or SMIM probes for parallel measurements across multiple samples 114, and the collected information for all of the samples 114 can be transferred to the second device 106 for combined analysis or comparison.

The first device 102 can couple, either directly or indirectly, to the network 104 to communicate with the second device 106 or can be a stand-alone device. The first device 102 can further be separated from or incorporated with a smart phone, a tablet computer, a laptop computer, a scanner, or other personal electronic devices.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof. In an embodiment, the second device 106 can execute image-processing, impedance-mapping, or data-classification software for AFM or SMIM datasets.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102. For example, the second device 106 can receive the SMIM baseband data or AFM deflection signals and perform advanced analysis, visualization, or data storage.

Also, for illustrative purposes, the measurement system 100 is described with the second device 106 as a computing device, although it is understood that the second device 106 can be different types of devices. Also, for illustrative purposes, the measurement system 100 is shown with the second device 106 and the first device 102 as endpoints of the network 104, although it is understood that the measurement system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

For example, a user 112 can utilize the first device 102 to initiate or supervise a measurement sequence of a sample 114, while the second device 106 can receive sensed measurement information, execute analytical routines, and return processed measurement information to the user 112. As an example, the user 112 can be an operator, a laboratory technician, an engineer, a scientist, or any other users of the measurement system 100. Also as an example, the second device 106 can be implemented as centralized or decentralized computing resources. This partition of control and computation can allow AFM and SMIM measurements to be performed locally while remote or higher-level devices perform impedance analysis, calibration, or visualization of results.

For example, the second device 106 can include the detection mechanism 116 for executing the analytical routines using the sensed measurement information. As an example, the detection mechanism 116 can include a probe control circuit, feedback electronics, and SMIM detection circuitry including microwave excitation, demodulation, and impedance-analysis components. Further details for operations, components, and technical aspects of the detection mechanism 116 will be described below in the description of the measurement system 100.

Figure 2:
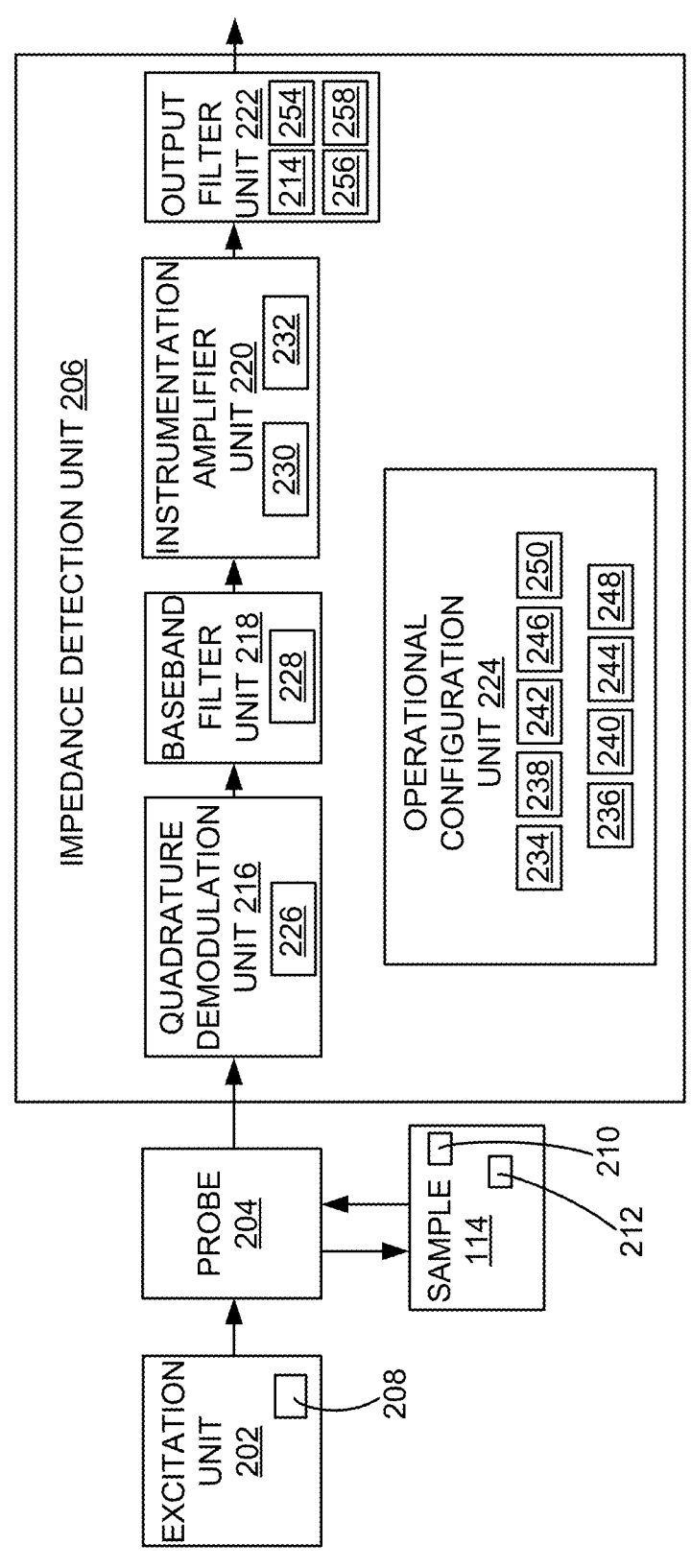
FIG. 2 is an example of a block diagram of the detection mechanism operating within the measurement system.

Referring now to FIG. 2, therein is shown an example of a block diagram of the detection mechanism 116 operating within the measurement system 100 of FIG. 1 in an embodiment of the present invention. The detection mechanism 116 can include an excitation unit 202, a probe 204, a sample 114, and an impedance detection unit 206 that are electrically or functionally coupled to perform measurement operations.

By way of an example, the excitation unit 202 is an electronic circuit that produces a controlled high-frequency signal used to drive the probe 204. The excitation unit 202 can generate a microwave excitation 208, which serves as an output of the excitation unit 202 and is supplied to the probe 204. For example, the excitation unit 202 includes a microwave source, oscillator, frequency synthesizer, or a combination thereof that produces a stable signal at a desired frequency or over a selectable range of frequencies.

By way of an example, the probe 204 is a conductive or metal-coated cantilever 205 that delivers the microwave excitation 208 to the sample 114 and senses the returning electrical response. The probe 204 can receive the microwave excitation 208 from the excitation unit 202 and can apply the microwave excitation 208 to the sample 114. The probe 204 can sense or receive a corresponding microwave response 210 from the sample 114. The probe 204 can include a conductive or metal-coated cantilever 205 that acts as a mechanical sensing element, an electrical path for the microwave excitation 208, or a combination thereof. For example, the probe is a common metal-coated AFM cantilever having a sharp tip, e.g., tip radius <10 nanometers (nm) to enable high lateral resolution. The cantilever can flex slightly due to forces between the probe tip and the sample 114, and this motion can be detected together with the electrical response. The probe 204 can deliver the microwave response 210 to the impedance detection unit 206 for conversion into measurable voltages.

By way of an example, the metal-coated cantilever 205 is a micro-mechanical beam used as the probe element in an atomic force microscope (AFM) or scanning microwave impedance microscope (SMIM). The metal-coated cantilever 205 can include a sharp conductive tip formed at or near its free end and a thin metallic layer—including gold (Au), platinum (Pt), titanium (Ti), or a combination thereof as examples—deposited on one or more surfaces of the cantilever body to provide electrical conductivity for microwave excitation and signal detection. The metal coating can allow the metal-coated cantilever 205 to act simultaneously as a mechanical force sensor and an electrical path between the excitation unit 202 and the sample 114.

By way of an example, the impedance detection unit 206 is an electrical-signal-processing circuit that receives the microwave response 210 from the probe 204 and converts the microwave response 210 into measurable low-frequency voltages. The impedance detection unit 206 can receive the microwave response 210 from the probe 204 and can generate a channel output voltage 214 as an output. The impedance detection unit 206 can convert the high-frequency microwave response 210 into DC baseband voltages, amplify those voltages, and output the channel output voltage 214 that represents the impedance characteristics of the sample 114. The impedance detection unit 206 can operate in synchronization with the excitation unit 202 so that amplitude and phase information in the microwave response 210 are accurately preserved in the channel output voltage 214. This synchronization can allow the measurement system 100 to correlate the microwave excitation 208 with the detected microwave response 210, enabling quantitative impedance mapping of the sample 114.

It has been unexpectedly discovered that direct synchronization between the excitation unit 202, which generates the microwave excitation 208, and the impedance detection unit 206, which processes the returning microwave response 210, allows the RF baseband DC-offset to be used as a signal rather than cancelled or filtered as in conventional SMIM circuits. By using the same detection path through the instrumentation amplifier unit 220 and the output filter unit 222, the measurement system 100 eliminates the complex analog cancellation network of prior designs, thereby reducing drift and simplifying operation. This discovery enables the channel output voltage 214 to provide simultaneous DC-baseband and AC-modulated information from the sample 114, yielding higher signal-to-noise ratio and quantitative stability in both contact and non-contact or tapping AFM probe modes.

It has been further unexpectedly discovered that direct utilization of the RF baseband DC-offset enables the measurement system 100 to directly read and monitor the input RF power level without requiring an external spectrum analyzer. This discovery allows real-time calibration and stability verification of the excitation signal using the same detection path, further simplifying hardware design and enhancing quantitative accuracy of impedance measurements.

By way of an example, the microwave excitation 208 is the output signal generated by the excitation unit 202. The microwave excitation 208 can be a high-frequency alternating electrical signal. For example, the microwave excitation 208 can be in the megahertz (MHz) or gigahertz (GHz) range, used to stimulate an electromagnetic interaction at the surface of the sample 114. The excitation unit 202 can control the amplitude, frequency, phase, or a combination thereof of the microwave excitation 208 and can include impedance-matching circuits that make energy transfer to the probe 204 more efficient.

By way of an example, the microwave response 210 is the electrical signal produced when the probe 204 interacts with the sample 114 after receiving the microwave excitation 208. The microwave response 210 can represent a reflected or transmitted electrical signal whose amplitude, phase, or a combination thereof varies according to the electrical and material properties of the sample 114 beneath the probe tip. For example, the microwave response 210 carries information about how the sample 114 stores or conducts electrical energy.

By way of an example, the microwave response variations 212 are small, localized changes in the microwave response 210 that occur because different regions of the sample 114 have different impedance values. The microwave response variations 212 can indicate how each part of the sample 114 resists or stores electrical energy. The microwave response variations 212 can include differences in how the sample 114 reflects the microwave excitation 208 back to the probe 204. For example, an impedance refers to opposition of the sample 114 to alternating current and depends on resistance, capacitance, or a combination thereof.

The sample 114 can be any solid, thin film, or layered structure whose electrical or material characteristics are to be analyzed. The sample 114 can be positioned on a stage that provides movement so the probe 204 can scan different regions of the surface of the sample 114. The sample 114 can exhibit microwave response variations 212, which are the local impedance changes that affect the microwave response 210 returning to the probe 204.

It has been unexpectedly discovered that integrating the quadrature demodulation unit 216, the baseband filter unit 218, the instrumentation amplifier unit 220, and the output filter unit 222 within a single impedance detection unit 206 provides both RF AC-modulated detection and direct DC-baseband detection over a continuous frequency range 258 extending from the direct-current (DC) value 254 to the predefined frequency value 256. This unified configuration achieves high lateral resolution with a common sharp metal-coated cantilever 205 such as the probe 204, high sensitivity and low noise from the moderate-gain amplifier network, and drift-free quantitative operation across multiple AFM imaging modes. As a result, the measurement system 100 enables a single hardware setup to perform both high-resolution contact-mode SMIM and damage-free non-contact SMIM without reconfiguration, fulfilling the long-sought combination of simplicity, precision, and versatility identified as missing in prior systems. A single hardware setup supports both contact-mode AFM (CM-AFM) and non-contact/tapping AFM (NC-AFM) with the same common sharp metal-coated cantilever 205.

The impedance detection unit 206 can include a quadrature demodulation unit 216, a baseband filter unit 218, an instrumentation amplifier unit 220, an output filter unit 222, and an operational configuration unit 224. These sub-units can operate together to process the microwave response 210 received from the probe 204 and to generate the channel output voltage 214 that represents the impedance characteristics of the sample 114.

By way of an example, the quadrature demodulation unit 216 is an electrical circuit that receives the microwave response 210 and converts the microwave response 210 into DC baseband signals. The quadrature demodulation unit 216 can receive the microwave response 210 from the probe 204 and can generate a baseband voltage 226 as an output. The quadrature demodulation unit 216 can perform signal mixing between the microwave response 210 and reference signals that have predetermined amplitude and phase relationships. By doing so, the quadrature demodulation unit 216 can separate the microwave response 210 into two orthogonal components, including the in-phase (I) and quadrature (Q) channels. The baseband voltage 226 can include these I and Q components and can carry information about the magnitude, phase, or a combination thereof of the reflected or transmitted microwave signal. The quadrature demodulation unit 216 can act as a signal converter that transforms the high-frequency microwave response 210 into slower, easier-to-measure voltages without losing the information about the phase or strength of the signal.

By way of an example, the baseband filter unit 218 is an electrical filter that receives the baseband voltage 226 and removes unwanted noise or high-frequency components. The baseband filter unit 218 can receive the baseband voltage 226 from the quadrature demodulation unit 216 and can generate a sense voltage 228 as its output. The baseband filter unit 218 can remove unwanted noise or out-of-band frequency components from the baseband voltage 226. The baseband filter unit 218 can include resistive and capacitive components arranged as low-pass filters to maintain signals only within a defined frequency range. The sense voltage 228 can represent the cleaned, low-noise version of the baseband voltage 226. The baseband filter unit 218 can function as a fine-tuning stage that smooths the baseband signals so that only useful information about the sample 114 remains.

By way of an example, the instrumentation amplifier unit 220 is a precision amplifier that receives the sense voltage 228 and boosts the signal strength for measurement. The instrumentation amplifier unit 220 can receive the sense voltage 228 from the baseband filter unit 218 and can generate an amplifier output voltage 230 as an output. The instrumentation amplifier unit 220 can apply a gain factor 252 to amplify the difference between two sense-node voltages while rejecting common-mode noise. The instrumentation amplifier unit 220 can also determine a common-mode voltage 232, which represents the average of the two sense-node voltages, and can internally compensate for the common-mode voltage 232 to maintain accuracy. The amplifier output voltage 230 can be a higher-level, low-distortion version of the sense voltage 228 that preserves the impedance-related variations captured from the sample 114. The instrumentation amplifier unit 220 can boost the useful signal while ignoring background electrical noise that affects both inputs equally.

By way of an example, the output filter unit 222 is a circuit that receives and limits the amplifier output voltage 230 bandwidth to a specific frequency range. The output filter unit 222 can receive the amplifier output voltage 230 from the instrumentation amplifier unit 220 and can generate the channel output voltage 214 as output. The channel output voltage 214 can be in a frequency range 258 from a direct-current (DC) value 254 to a predefined frequency value 256. For example, the predefined frequency value 256 can be approximately 1 megahertz (MHz). The output filter unit 222 can include active or passive filter components that limit the bandwidth of the amplifier output voltage 230 to the frequency range 258, ensuring that the resulting channel output voltage 214 includes only frequencies that are useful for imaging or data acquisition. The output filter unit 222 can therefore establish the measurement bandwidth of the impedance detection unit 206.

By way of an example, the operational configuration unit 224 is a control subsystem that defines or selects how the impedance detection unit 206 operates. The operational configuration unit 224 can control or configure one or more of the sub-units in the impedance detection unit 206. The operational configuration unit 224 can store or define operational parameters in software, hardware, or a combination thereof. These parameters can include imaging and feedback modes for the atomic force microscope. The operational configuration unit 224 can include configuration settings for an atomic force microscope (AFM) imaging mode 234, an approach-retract scan mode 236, an off-resonance tapping mode 238, a shear mode 240, a torsional mode 242, a current feedback mode 244, an AFM probe mode 246, a contact mode 248, and a non-contact mode 250. Each of these settings can define how the probe 204 interacts with the sample 114, such as whether the cantilever is in physical contact, oscillating near resonance, or scanned at a controlled distance above the surface.

By way of an example, the AFM imaging mode 234 is a configuration within the operational configuration unit 224 that sets how the AFM probe 204 scans or images the sample 114. The AFM imaging mode 234 can define parameters, such as scan speed, feedback response, and signal mapping used to form surface images. By way of an example, the approach-retract scan mode 236 is a control setting that makes the probe 204 move toward and away from the sample 114 in cycles. This mode can help measure surface forces or electrical responses as the tip approaches and retracts, similar to gently tapping the surface at each point.

By way of an example, the off-resonance tapping mode 238 is a mode in which the probe 204 oscillates at a frequency below its natural resonance frequency. This configuration can provide stable imaging of soft materials by reducing mechanical vibration amplitude. For example in an AFM tapping mode, the probe 204 intermittently contacts a surface of the sample 114 to minimize lateral drag and damage to the sample 114. For another example in an AFM tapping mode in truly non-contact operation, the probe 204 oscillates close to or near a surface of the sample 114 without physical contact. In a specific example, the tip of the probe 204 is close or near the surface that the tip is deflected by the sample/tip interaction.

By way of an example, the shear mode 240 is a setting that moves the probe 204 laterally across the surface of the sample 114 instead of vertically. This mode can help characterize frictional or viscoelastic properties of the surface.

By way of an example, the torsional mode 242 is a configuration in which the cantilever of the probe 204 twists around its axis while scanning. This motion can detect rotational or tangential forces acting on the tip when it interacts with the sample 114. By way of an example, the current feedback mode 244 is an operational setting that maintains a constant electrical current between the probe 204 and the sample 114. This feedback mode can adjust the tip position automatically so that the measured current stays stable, allowing mapping of conductive regions.

By way of an example, the AFM probe mode 246 is a general operational mode that defines how the probe 204 functions in the AFM system, including signal detection and mechanical feedback. By way of an example, the contact mode 248 is a configuration where the probe 204 remains in continuous physical contact with the surface of the sample 114 during scanning. This mode can provide high-resolution topography but may cause tip or sample wear for soft materials. By way of an example, the non-contact mode 250 is a configuration where the probe 204 oscillates or hovers near the sample 114 without making physical contact. This mode can allow measurement of surface properties such as capacitance or impedance while preventing damage to delicate samples.

By way of an example, the gain factor 252 is a numerical or electrical parameter within the instrumentation amplifier unit 220 that determines how much the differential portion of the sense voltage 228 is amplified to produce the amplifier output voltage 230. The gain factor 252 can be implemented by a resistor network, a programmable amplifier setting, or a digital control value that scales the amplitude of the signal.

By way of an example, the direct-current (DC) value 254 is the lower limit of the frequency range defined by the output filter unit 222. The direct-current (DC) value 254 can correspond to a frequency of zero hertz. The direct-current (DC) value 254 can establish the baseline of the output-filter passband so that very slow or steady electrical components of the amplifier output voltage 230 are preserved for measurement.

By way of an example, the predefined frequency value 256 is the upper limit of the frequency range defined by the output filter unit 222. The predefined frequency value 256 can correspond to a selected cutoff frequency that limits the highest signal variations passed by the output filter unit 222. The predefined frequency value 256 can establish the bandwidth boundary beyond which unwanted high-frequency noise or harmonics are attenuated.

By way of an example, the frequency range 258 is the span of frequencies defined between the direct-current (DC) value 254 and the predefined frequency value 256 in the output filter unit 222. The frequency range 258 can specify the allowable bandwidth of the amplifier output voltage 230 that is converted into the channel output voltage 214. The frequency range 258 can determine which portions of the signal spectrum are retained for analysis, ensuring that the channel output voltage 214 includes only frequencies useful for impedance characterization of the sample 114. The output filter unit 222 can generate the channel output voltage 214 based on the amplifier output voltage 230 after removal of the common-mode voltage 232 and within the frequency range 258 from the direct-current (DC) value 254 to the predefined frequency value 256.

The quadrature demodulation unit 216 can generate a first demodulation voltage 260, which corresponds to an I/Q+ output representing an in-phase (I) or quadrature (Q) component in a first polarity. The quadrature demodulation unit 216 can generate a second demodulation voltage 262, which corresponds to an I/Q– output representing an in-phase (I) or quadrature (Q) component in a second polarity different from or opposite to the first polarity. The baseband voltage 226 can include the first demodulation voltage 260 and the second demodulation voltage 262 so that magnitude and phase information of the microwave response 210 are preserved for subsequent processing. By way of an example, the first demodulation voltage 260 can correspond to the I/Q+ terminal of the quadrature demodulation unit 216 and can carry either the I component or the Q component depending on the selected reference phase. By way of an example, the second demodulation voltage 262 can correspond to the I/Q– terminal of the quadrature demodulation unit 216 and can carry the complementary polarity of the same I component or Q component selected for the first demodulation voltage 260.

The baseband filter unit 218 can provide a first sense-node voltage 264 and a second sense-node voltage 266 that are resistively coupled to the baseband voltage 226. The term 'resistively coupled' can include a resistor network that connects the baseband voltage 226 to each sense node so that each sense node receives a controlled fraction of the baseband voltage 226 while providing a return path for downstream amplification. The sense voltage 228 can include the first sense-node voltage 264 and the second sense-node voltage 266 after removal of out-of-band components. The instrumentation amplifier unit 220 can apply the gain factor

252 to a difference between the first sense-node voltage 264 and the second sense-node voltage 266 to generate the amplifier output voltage 230.

The instrumentation amplifier unit 220 can determine the common-mode voltage 232 from the first sense-node voltage 264 and the second sense-node voltage 266 and can remove the common-mode voltage 232 from the amplifier output voltage 230 so that the output filter unit 222 receives a differential signal for formation of the channel output voltage 214. By way of an example, the first sense-node voltage 264 is a conditioned baseband node voltage provided by the baseband filter unit 218 that is resistively coupled to the baseband voltage 226. By way of an example, the second sense-node voltage 266 is a conditioned baseband node voltage provided by the baseband filter unit 218 that is resistively coupled to the baseband voltage 226.

Figure 3:
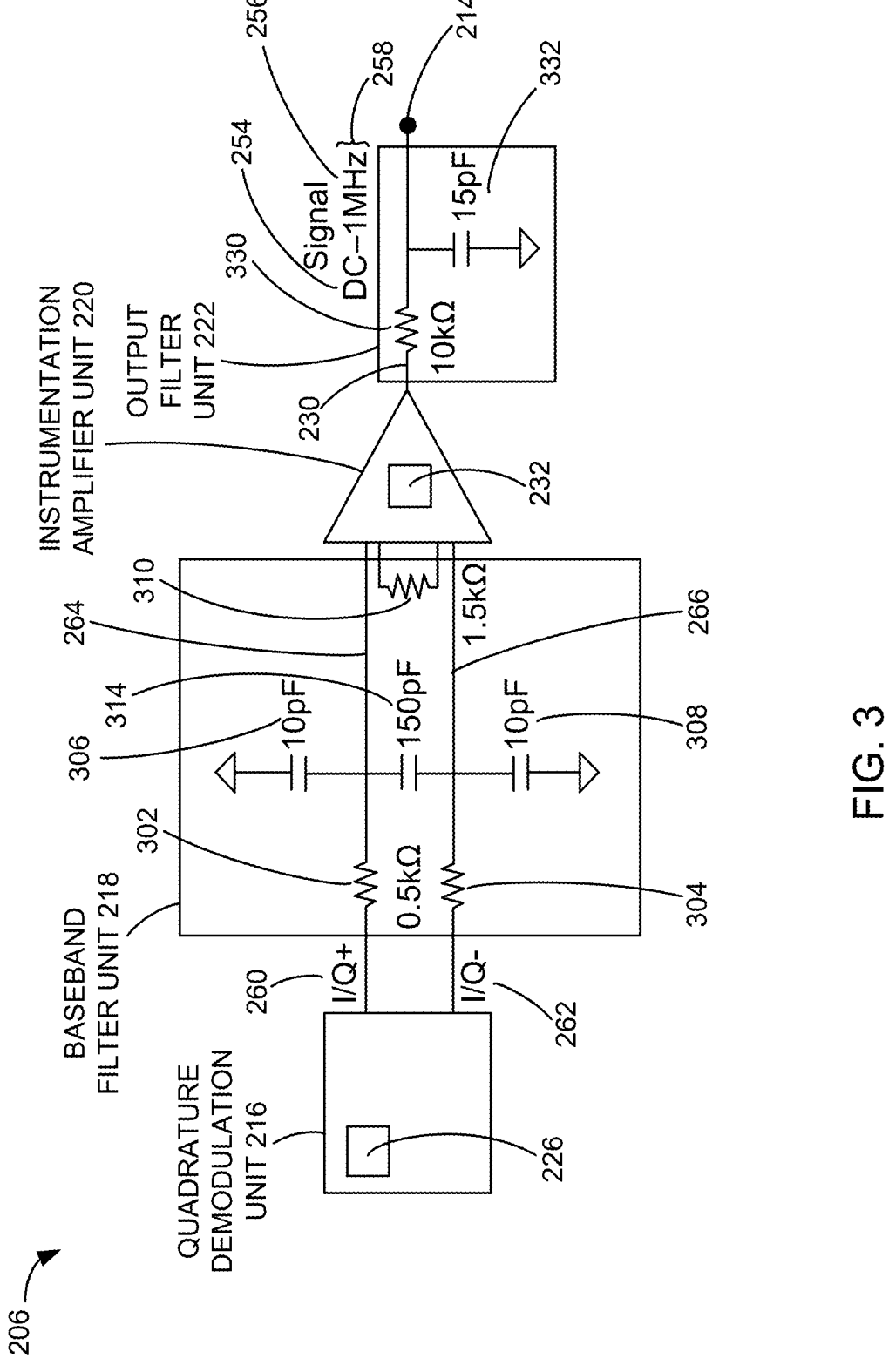
FIG. 3 is an example of a circuit implementation of an impedance detection unit.

Referring now to FIG. 3, therein is shown an example of a circuit implementation of an impedance detection unit 206. The first demodulation voltage 260 and the second demodulation voltage 262 from a quadrature demodulation unit 216 can enter a symmetrical baseband filter unit 218 that conditions the signals and provides the first sense-node voltage 264 and the second sense-node voltage 266 to an instrumentation amplifier unit 220. The instrumentation amplifier unit 220 can generate an amplifier output voltage 230 that is bandwidth-limited by an output filter unit 222 to produce a channel output voltage 214 within a frequency range 258 extending from a direct-current (DC) value 254 to a predefined frequency value 256.

The baseband filter unit 218 can include a first series resistor 302 and a second series resistor 304 connected respectively in series with the first demodulation voltage 260 (I/Q+) and the second demodulation voltage 262 (I/Q–). The first series resistor 302 and the second series resistor 304 can provide resistive coupling between the quadrature demodulation unit 216 and the instrumentation amplifier unit 220. Each resistor can set the input impedance and can work together with shunt capacitors to limit high-frequency noise before amplification.

By way of an example, a first series resistor 302 is connected in series with the first demodulation voltage 260 (I/Q+) to form part of a low-pass resistor-capacitor (RC) network. By way of an example, a second series resistor 304 is connected in series with the second demodulation voltage 262 (I/Q–) to maintain symmetrical impedance and matching on both signal paths. For illustration purposes, the first series resistor 302 and the second series resistor 304 are 0.5 kΩ resistors, although it is understood that the series resistors can be any other values.

The baseband filter unit 218 can further include a first shunt capacitor 306 and a second shunt capacitor 308 connected respectively from each filtered node of the I/Q+ and I/Q– paths to a reference voltage including ground or any other reference voltage level. The first shunt capacitor 306 and the second shunt capacitor 308 can combine with the first series resistor 302 and the second series resistor 304 respectively to create matched low-pass filters that remove residual carrier components and high-frequency noise, thereby isolating the baseband information of the sample response.

By way of an example, the first shunt capacitor 306 is connected from the filtered I/Q+ node to ground to form, with the first series resistor 302, a first-order low-pass filter. By way of an example, the second shunt capacitor 308 is connected from the filtered I/Q– node to ground to form, with the second series resistor 304, a corresponding first-order low-pass filter on the complementary signal path. For illustration purposes, the first shunt capacitor 306 and the second shunt capacitor 308 are 10 pF capacitors, although it is understood that the shunt capacitors can be any other values.

A baseband integration capacitor 314 can be connected between the filtered I/Q+ and I/Q– nodes of the baseband filter unit 218. The baseband integration capacitor 314 can provide a common differential coupling that equalizes the two paths and further extends the low-pass behavior of the filter. The capacitor 314 can suppress differential noise components that appear between the filtered I/Q+ and I/Q– paths and can enhance common-mode balance prior to amplification. By way of an example, the baseband integration capacitor 314 is connected between the two filtered input nodes to provide differential integration and symmetric low-pass conditioning. For illustration purposes, the baseband integration capacitor 314 is a 150 pF capacitor, although it is understood that the baseband integration capacitor 314 can be any other values.

It has been unexpectedly discovered that the configuration of the first series resistor 302, the second series resistor 304, the first shunt capacitor 306, the second shunt capacitor 308, and the baseband integration capacitor 314 within the baseband filter unit 218 provides matched low-pass filtering that stabilizes the differential path and eliminates drift and phase imbalance common in prior SMIM circuits. The symmetrical resistor-capacitor network allows both the DC baseband and AC-modulated components of the microwave response 210 to be preserved and balanced before amplification by the instrumentation amplifier unit 220, enabling cancellation-free operation and high-sensitivity impedance detection using a single hardware path.

The instrumentation amplifier unit 220 can receive the filtered I/Q+ and I/Q– signals from the baseband filter unit 218 as the first sense-node voltage 264 and the second sense-node voltage 266. The instrumentation amplifier unit 220 can amplify the difference between the first sense-node voltage 264 and the second sense-node voltage 266 with the gain factor 252 determined by a single external gain resistor 310. The instrumentation amplifier unit 220 can also determine the common-mode voltage 232 as an average of the first sense-node voltage 264 and the second sense-node voltage 266 and can remove the common-mode voltage 232 from the amplifier output voltage 230 to maintain a clean differential output for subsequent filtering.

For example, the instrumentation amplifier unit 220 generates the amplifier output voltage 230 by the transfer function $V_{OUT}=G\times(V_{IN+}-V_{IN-})+V_{REF}$, where $V_{IN+}$ and $V_{IN-}$ correspond respectively to the first sense-node voltage 264 and the second sense-node voltage 266 provided by the baseband filter unit 218, and $V_{REF}$ represents a reference potential coupled to a reference terminal of the instrumentation amplifier unit 220. The gain G of the instrumentation amplifier unit 220 is determined by the gain resistor 310 according to $G=1+6$ k$\Omega$/R$_G$, where R$_G$ corresponds to the gain resistor 310 connected across the gain-setting pins of the instrumentation amplifier unit 220. This transfer function allows the instrumentation amplifier unit 220 to provide a predetermined differential amplification of the first sense-node voltage 264 and the second sense-node voltage 266 while maintaining common-mode rejection and output-offset control.

Continuing the example, the gain resistor 310 determines the internal differential gain while operating in conjunction with external protection resistors including the first series resistor 302 and the second series resistor 304. The first sense-node voltage 264 and the second sense-node voltage 266 delivered by the baseband filter unit 218 appear at the differential input terminals of the instrumentation amplifier unit 220. The voltage difference ($V_{IN+}-V_{IN-}$) determined by the first sense-node voltage 264 and the second sense-node voltage 266 establishes a differential current through the gain resistor 310. This current determines the magnitude of the amplifier output voltage 230 according to the transfer function $V_{OUT}=G\times(V_{IN+}-V_{IN-})+V_{REF}$, where $G=1+(6$ k$\Omega$/R$_G$) and R$_G$ represents the gain resistor 310. In this arrangement, the gain resistor 310 provides both the trans-resistive path that converts the sensed differential voltage into an amplified output and an inherent current-limiting element when combined with the series input resistors 302 and 304, thereby stabilizing the differential signal flow and preserving common-mode rejection within the instrumentation amplifier unit 220.

For example, the baseband filter unit 218 provides the first sense-node voltage 264 and the second sense-node voltage 266, denoted $V_1$ and $V_2$. The instrumentation amplifier unit 220 can decompose these node voltages into a differential component $V_A=V_1-V_2$ and a common-mode component $V_{CM}=(V_1+V_2)/2$. The instrumentation amplifier unit 220 applies a differential gain G while rejecting the common-mode voltage 232 so that the output is $V_{out}=G(V_1-V_2)+V_{REF}$ Any residual common-mode gain $A_{cm}$ produces an error term $A_{cm}V_{CM}$ in the output, whereas the ideal differential gain is $A_d=G$. The ratio CMRR$=A_d/A_{cm}$ indicates the degree of rejection; hence the residual common-mode component is $V_{out,err}=(G/CMRR_{lin})$ $V_{CM}$. For high CMRR, this term is negligible, meaning the instrumentation amplifier unit 220 effectively removes the common-mode voltage 232 and outputs only the amplified differential signal.

Continuing the example, with the gain resistor 310 setting $G=1+6$ k$\Omega$/R$_G$, the instrumentation amplifier unit 220 generates the amplifier output voltage 230 as $V_{230}=G(V_1-V_2)+V_{REF}$. The output filter unit 222 then limits $V_{230}$ to the frequency range 258 between the direct-current (DC) value 254 and the predefined frequency value 256 to form the channel output voltage 214. For illustration purposes, the node annotated 'Signal DC-1 MHz' in FIG. 3 corresponds to the channel output voltage 214 after bandwidth limiting by the output filter unit 222 between the direct-current (DC) value 254 and the predefined frequency value 256.

By way of an example, the gain resistor 310 is connected between the gain-setting pins of the instrumentation amplifier unit 220 to determine the gain factor 252 applied to the differential signal between the first sense-node voltage 264 and the second sense-node voltage 266. For illustration purposes, the gain resistor 310 is a 1.5 k$\Omega$ resistor, although it is understood that the gain resistor 310 can be any other values.

The amplifier output voltage 230 from the instrumentation amplifier unit 220 can be applied to the output filter unit 222 to limit the system bandwidth. The output filter unit 222 can include an output load resistor 330 and an output coupling capacitor 332 connected in parallel to a reference voltage including ground or any other reference level to form a low-pass network. The output load resistor 330 and the output coupling capacitor 332 can establish the upper cutoff of the measurement band near the predefined frequency value 256, e.g., approximately 1 Megahertz (MHz) or any other values, while allowing all lower-frequency components including the DC response to pass through.

By way of an example, the output load resistor 330 is connected at the instrumentation amplifier unit 220 output to define the output impedance and, together with the output coupling capacitor 332, to determine the upper-cutoff frequency. By way of an example, the output coupling capacitor 332 is connected in parallel with the output load resistor 330 to form the roll-off network that enforces the predefined frequency value 256. For illustration purposes, the output load resistor 330 is a 10 kΩ resistor and the output coupling capacitor 332 is a 15 pF capacitor, although it is understood that the output load resistor 330 and the output coupling capacitor 332 can be any other values.

The first demodulation voltage 260 (I/Q+) and the second demodulation voltage 262 (I/Q–) can pass through the first series resistor 302 and the second series resistor 304, respectively, while the first shunt capacitor 306, the second shunt capacitor 308, and the baseband integration capacitor 314 provide symmetrical low-pass filtering that produces the first sense-node voltage 264 and the second sense-node voltage 266. The instrumentation amplifier unit 220, with gain determined by the gain resistor 310, can amplify the difference of the first sense-node voltage 264 and the second sense-node voltage 266 while removing the common-mode voltage 232 to generate the amplifier output voltage 230. The output filter unit 222, using the output load resistor 330 and the output coupling capacitor 332, can further limit the amplifier output voltage 230 to the frequency range 258 from the direct-current (DC) value 254 to the predefined frequency value 256 and can output the channel output voltage 214 suitable for measurement and imaging.

It has been unexpectedly discovered that the combination of the instrumentation amplifier unit 220, the single gain resistor 310, and the output filter unit 222—including the output load resistor 330 and output coupling capacitor 332—produces a continuous measurement bandwidth from the direct-current (DC) value 254 to the predefined frequency value 256 of approximately 1 MHz without requiring separate DC and AC circuits. This discovery enables the channel output voltage 214 to simultaneously convey low-frequency and high-frequency information derived from the microwave response 210, resulting in high-resolution, low-noise impedance imaging for both contact and non-contact AFM probe modes while maintaining a simple, stable, and cancellation-free circuit configuration.

For example, the impedance detection unit 206 can generate the channel output voltage 214 in the frequency range 258 from the direct-current (DC) value 254 to the predefined frequency value 256 of approximately 1 MHz by using the component values shown in FIG. 3. The baseband filter unit 218 can use the first series resistor 302 and the second series resistor 304 each having an example resistance of 0.5 kΩ, and the first shunt capacitor 306 and the second shunt capacitor 308 each having an example capacitance of 10 pF. The resistor-capacitor pairs can provide first-order low-pass filters that suppress frequencies above the predefined frequency value 256 of approximately 1 MHz while passing the desired baseband signal.

Continuing the example, the baseband integration capacitor 314 having an example capacitance of 150 pF can extend the low-pass response and maintain balance between the two inputs associated with the first sense-node voltage 264 and the second sense-node voltage 266 to the instrumentation amplifier unit 220. The gain resistor 310 having an example resistance of 1.5 kΩ can set the gain factor 252 of the instrumentation amplifier unit 220 to a stable level for operation up to approximately 1 MHz. The output filter unit 222 including the output load resistor 330 of 10 kΩ and the output coupling capacitor 332 of 15 pF can form a final low-pass network that determines the predefined frequency value 256 approximately 1 MHz, ensuring that the resulting channel output voltage 214 remains within the predefined measurement bandwidth.

Figure 4:
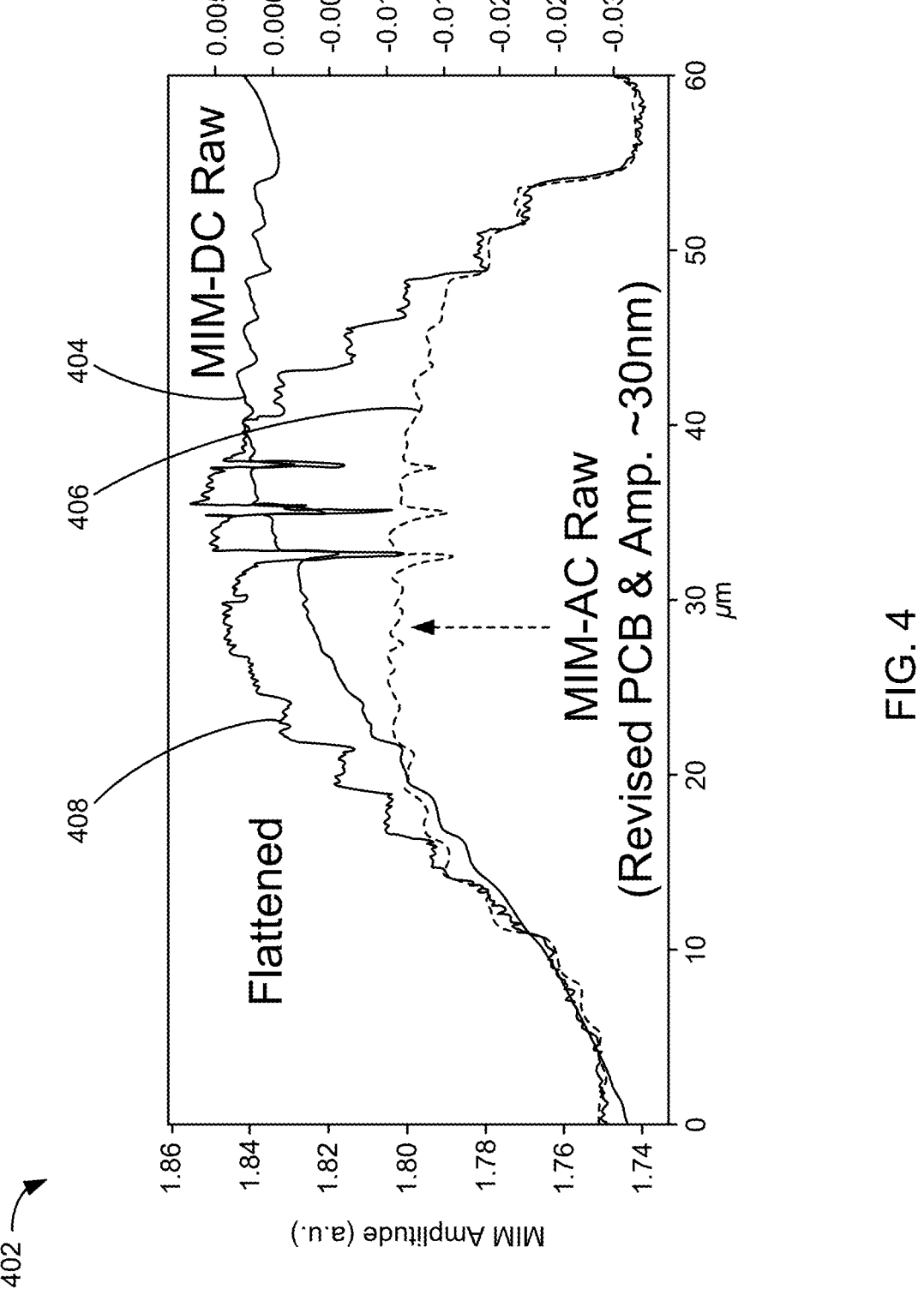
FIG. 4 is an example graph of measurement results demonstrating an operation of the impedance detection unit.

Referring now to FIG. 4, therein is shown an example graph 402 of measurement results demonstrating an operation of the impedance detection unit 206 of FIG. 2. The example presents plots of MIM amplitude data obtained from both AC- and DC-baseband detection using a revised printed-circuit-board (PCB) and the impedance detection unit 206. For example, "a.u." on the left vertical axis stands for arbitrary units, indicating that the MIM amplitude is shown on a relative scale proportional to the detected signal strength rather than an absolute calibrated value. The solid curve 404 labeled "MIM-DC Raw" represents the unprocessed DC-baseband output of the measurement system 100, while the dashed curve 406 labeled "MIM-AC Raw (Revised PCB & Amp., ≈30 nm)" represents the simultaneously acquired AC-modulated response. One AC dataset was acquired at ~30 nm tip-sample spacing. The curve 408 labeled "Flattened" shows the post-processed data obtained by linear-regression removal of background curvature.

Continuing the example, the revised circuit of the impedance detection unit 206, which includes the single 1.5 kΩ gain resistor 310 of FIG. 3, the 0.5 kΩ input resistors 302 of FIG. 3 and 304 of FIG. 3, and the filtering network shown in FIG. 3 including the baseband filter unit 218 of FIG. 2 and the output filter unit 222 of FIG. 2, can generate stable MIM-AC and MIM-DC signals over a spatial range of approximately 60 μm. The combined output exhibits consistent amplitude tracking between the AC- and DC-channels, confirming that the same amplifier and PCB revision support both DC baseband and AC modulation within the frequency range 258 of FIG. 2 from DC to approximately 1 MHz. The detection mechanism 116 of FIG. 1 with the improved amplifier and filter configuration allows the microscope to capture both slow (DC) and fast (AC) electrical responses of the sample 114 of FIG. 1 in one setup, producing clean, drift-free curves that demonstrate the dual-mode operation of the SMIM module, such as the impedance detection unit 206, for reading DC/AC SMIM signals.

Figure 5:
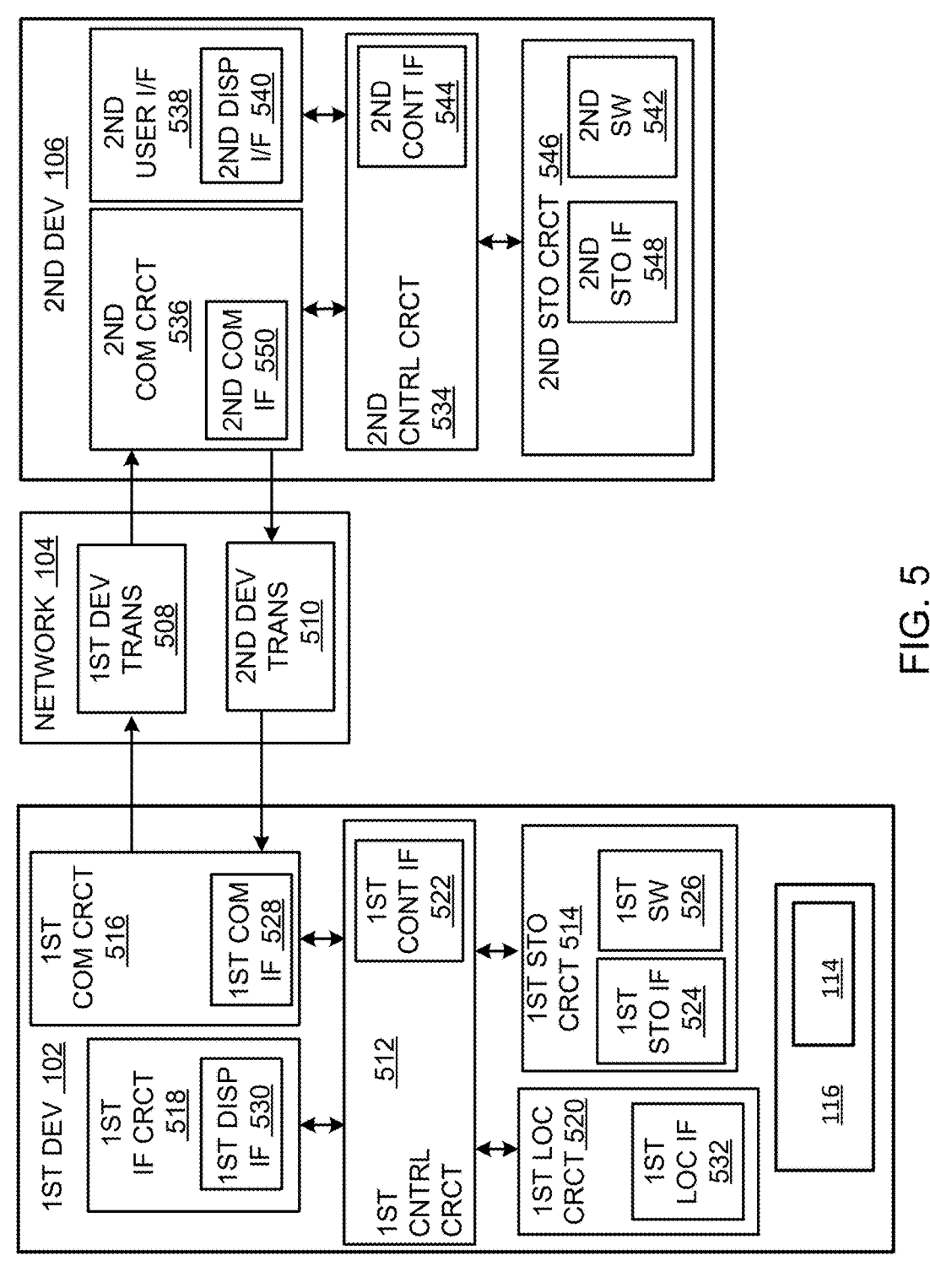
FIG. 5 is an exemplary block diagram of the measurement system in an embodiment.

Referring now to FIG. 5, therein is shown an exemplary block diagram of the measurement system 100 in an embodiment. The measurement system 100, a portion of the measurement system 100, or a combination thereof can execute the detection mechanism 116 of FIG. 1. The measurement system 100 can include the first device 102, the network 104, and the second device 106. The first device 102 can send information in a first device transmission 508 over the network 104 to the second device 106. The second device 106 can send information in a second device transmission 510 over the network 104 to the first device 102.

For illustrative purposes, the measurement system 100 is shown with the first device 102 as a client device, although it is understood that the measurement system 100 can include the first device 102 as a different type of device.

Also, for illustrative purposes, the measurement system 100 is shown with the second device 106 as a server, although it is understood that the measurement system 100 can include the second device 106 as a different type of device. For example, the second device 106 can be a client device. By way of an example, the measurement system 100 can be implemented entirely on the first device 102 with some functions of the detection mechanism 116 executed by a first control circuit 512.

Also, for illustrative purposes, the measurement system 100 is shown with interaction between the first device 102 and the second device 106. However, it is understood that the first device 102 can be a part of or the entirety of a tablet computer, a smart phone, or a combination thereof. Similarly, the second device 106 can similarly interact with the first device 102 representing the tablet computer, the smart phone, or a combination thereof. For example, the measurement system 100 can operate an atomic force microscope (AFM) including a SMIM module, in which the first device 102 controls probe motion and signal acquisition and the second device 106 performs impedance mapping or image reconstruction.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include the first control circuit 512, a first storage circuit 514, a first communication circuit 516, a first interface circuit 518, and a first location circuit 520. The first control circuit 512 can include a first control interface 522. The first control circuit 512 can execute a first software 526 to provide the intelligence of the measurement system 100.

The first control circuit 512 can be implemented in a number of different manners. For example, the first control circuit 512 can be a processor, an application specific integrated circuit (ASIC), an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102. The first control circuit 512 can process information associated with the sample 114 and execute portions of the detection mechanism 116.

The first control interface 522 can receive information from the other functional units/circuits or from external sources, or can transmit information to the other functional units/circuits or to external destinations. The external sources and the external destinations refer to sources and destinations external to the first device 102. The first control circuit 512 can generate and synchronize drive waveforms for the AFM scanner and the microwave excitation unit 202 of FIG. 2 and can receive feedback signals including cantilever deflection and SMIM baseband voltages.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, cantilever deflection sensor, piezoelectric scanner control, microwave circuitry, or a combination thereof.

The first storage circuit 514 can store the first software 526. The first storage circuit 514 can also store the relevant information, such as data representing incoming samples 114, the detection mechanism 116 and the other embodiments, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random-access memory (NVRAM), Flash memory, disk storage, or a volatile storage such as static random-access memory (SRAM).

The first storage circuit 514 can include a first storage interface 524. The first storage interface 524 can be used for communication between the first storage circuit 514 and other functional units or circuits in the first device 102. The first storage interface 524 can also be used for communication that is external to the first device 102.

The first storage interface 524 can receive information from the other functional units/circuits or from external sources, or can transmit information to the other functional units/circuits or to external destinations. The external sources and the external destinations refer to sources and destinations external to the first device 102. The first storage interface 524 can receive input from and source data to the detection mechanism 116.

The first storage interface 524 can include different implementations depending on which functional units/circuits or external units/circuits are being interfaced with the first storage circuit 514. The first storage interface 524 can be implemented with technologies and techniques similar to the implementation of the first control interface 522. The first storage circuit 514 can store AFM height data, SMIM impedance spectra, or combined datasets for later analysis or calibration.

The first communication circuit 516 can enable external communication to and from the first device 102. For example, the first communication circuit 516 can permit the first device 102 to communicate with the second device 106 and the network 104. The first communication circuit 516 can interact with the second device 106 for implementing the detection mechanism 116.

The first communication circuit 516 can also function as a communication hub allowing the first device 102 to function as part of the network 104 and not limited to be an endpoint or terminal circuit to the network 104. The first communication circuit 516 can include active and passive components, such as microelectronics or an antenna, for interaction with the network 104. The first communication circuit 516 can relay real-time AFM tip-position and SMIM signal data to the second device 106 for image formation.

The first communication circuit 516 can include a first communication interface 528. The first communication interface 528 can be used for communication between the first communication circuit 516 and other functional units or circuits in the first device 102. The first communication interface 528 can receive information from the second device 106 for distribution to the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522.

The first interface circuit 518 allows the user 112 of FIG. 1 to interface and interact with the first device 102. The first interface circuit 518 can include an input device and an output device. Examples of the input device of the first interface circuit 518 can include a keypad, a touchpad, soft-keys, a keyboard, a microphone, a camera, an infrared sensor for receiving remote signals, or any combination thereof to provide data and communication inputs, such as the sample 114. The first interface circuit 518 can receive the sample 114 provided by the user 112 that can be manipulated by the first control circuit 512. The first interface circuit 518 can allow the user 112 to select scan regions, adjust probe-sample distance, and display SMIM amplitude or phase images.

The first interface circuit 518 can include a first display interface 530. The first display interface 530 can include an output device. The first display interface 530 can include a projector, a video screen, a touch screen, a speaker, a microphone, a keyboard, and combinations thereof. The first display interface 530 can allow the user 112 to view the results of the detection mechanism 116 and the other embodiments on the output device.

The first control circuit 512 can operate the first interface circuit 518 to display information generated by the measurement system 100 and receive input from the user 112. The first control circuit 512 can also execute the first software 526 for the other functions of the measurement system 100, including receiving location information from the first location circuit 520. The first control circuit 512 can further execute the first software 526 for interaction with the network 104 via the first communication circuit 516. The first control circuit 512 can operate portions or all of the detection mechanism 116.

The first control circuit 512 can also receive location information from the first location circuit 520. The first control circuit 512 can operate the detection mechanism 116 or portions thereof. The first control circuit 512 can operate on information associated with the sample 114, as well as any of the output for the detection mechanism 116 and any of the embodiments for display to the user 112.

The first location circuit 520 can be implemented in many ways. For example, the first location circuit 520 can function as at least a part of the global positioning system, an inertial compute system, a cellular-tower location system, a gyroscope, or any combination thereof. Also, for example, the first location circuit 520 can utilize components such as an accelerometer, gyroscope, or global positioning system (GPS) receiver.

The first location circuit 520 can include a first location interface 532. The first location interface 532 can be used for communication between the first location circuit 520 and other functional units or circuits in the first device 102.

The first location interface 532 can receive information from the other functional units/circuits or from external sources, or can transmit information to the other functional units/circuits or to external destinations. The external sources and the external destinations refer to sources and destinations external to the first device 102. The first location interface 532 can receive the global positioning location from the global positioning system (not shown).

The first location interface 532 can include different implementations depending on which functional units/circuits or external units/circuits are being interfaced with the first location circuit 520. The first location interface 532 can be implemented with technologies and techniques similar to the implementation of the first control circuit 512.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows an operator (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or a combination thereof.

The second control circuit 534 can execute a second software 542 to provide the intelligence of the second device 106 of the measurement system 100. The second software 542 can operate in conjunction with the first software 526. The second control circuit 534 can provide additional performance compared to the first control circuit 512. The second control circuit 534 can execute instructions to implement all or some of the functions of the detection mechanism 116.

The second control circuit 534 can operate the second user interface 538 to display information. The second control circuit 534 can also execute the second software 542 for the other functions of the measurement system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

The second storage circuit 546 can store the second software 542. The second storage circuit 546 can also store the information such as data representing incoming sample 114, data representing, including but not limited to sound files, or a combination thereof. The second storage circuit 546 can be sized to provide the additional storage capacity to supplement the first storage circuit 514.

For illustrative purposes, the second storage circuit 546 is shown as a single element, although it is understood that the second storage circuit 546 can be a distribution of storage elements. Also, for illustrative purposes, the measurement system 100 is shown with the second storage circuit 546 as a single hierarchy storage system, although it is understood that the measurement system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a controller of a volatile memory, a nonvolatile memory, an internal memory, an external memory, or a combination thereof. For example, the second storage circuit 546 can be a controller of a nonvolatile storage such as non-volatile random-access memory (NVRAM), Flash memory, disk storage, or a volatile storage such as static random access memory (SRAM). The second storage circuit 546 can store AFM topography maps, SMIM amplitude and phase data, and derived property maps including conductivity or permittivity.

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544.

The second communication circuit 536 can enable external communication to and from the second device 106. For example, the second communication circuit 536 can permit the second device 106 to communicate with the first device 102 over the network 104.

The second communication circuit 536 can also function as a communication hub allowing the second device 106 to function as part of the network 104 and not limited to be an endpoint or terminal unit or circuit to the network 104. The second communication circuit 536 can include active and passive components, such as microelectronics or an antenna, for interaction with the network 104.

The second communication circuit 536 can include a second communication interface 550. The second communication interface 550 can be used for communication between the second communication circuit 536 and other functional units or circuits in the second device 106. The second communication interface 550 can receive information from the other functional units/circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544. The second communication circuit 536 can support remote microscope monitoring and cloud-based data processing for AFM/SMIM imaging.

The second communication circuit 536 can couple with the network 104 to send information to the first device 102. The first device 102 can receive information in the first communication circuit 516 from the second device transmission 510 of the network 104. The measurement system 100 can be executed by the first control circuit 512, the second control circuit 534, or a combination thereof. For illustrative purposes, the second device 106 is shown with the partition including the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium including instructions for performing the software function of the detection mechanism 116, a portion therein, or a combination thereof.

For illustrative purposes, the measurement system 100 is described by operation of the first device 102 and the second device 106. It is understood that the first device 102 and the second device 106 can operate any of the modules or units and functions of the measurement system 100 including a distribution of the functions of the detection mechanism 116. For example, the modules or units include the AFM scanner control, SMIM excitation and detection electronics, the image-processing software, or a combination thereof.

Figure 6:
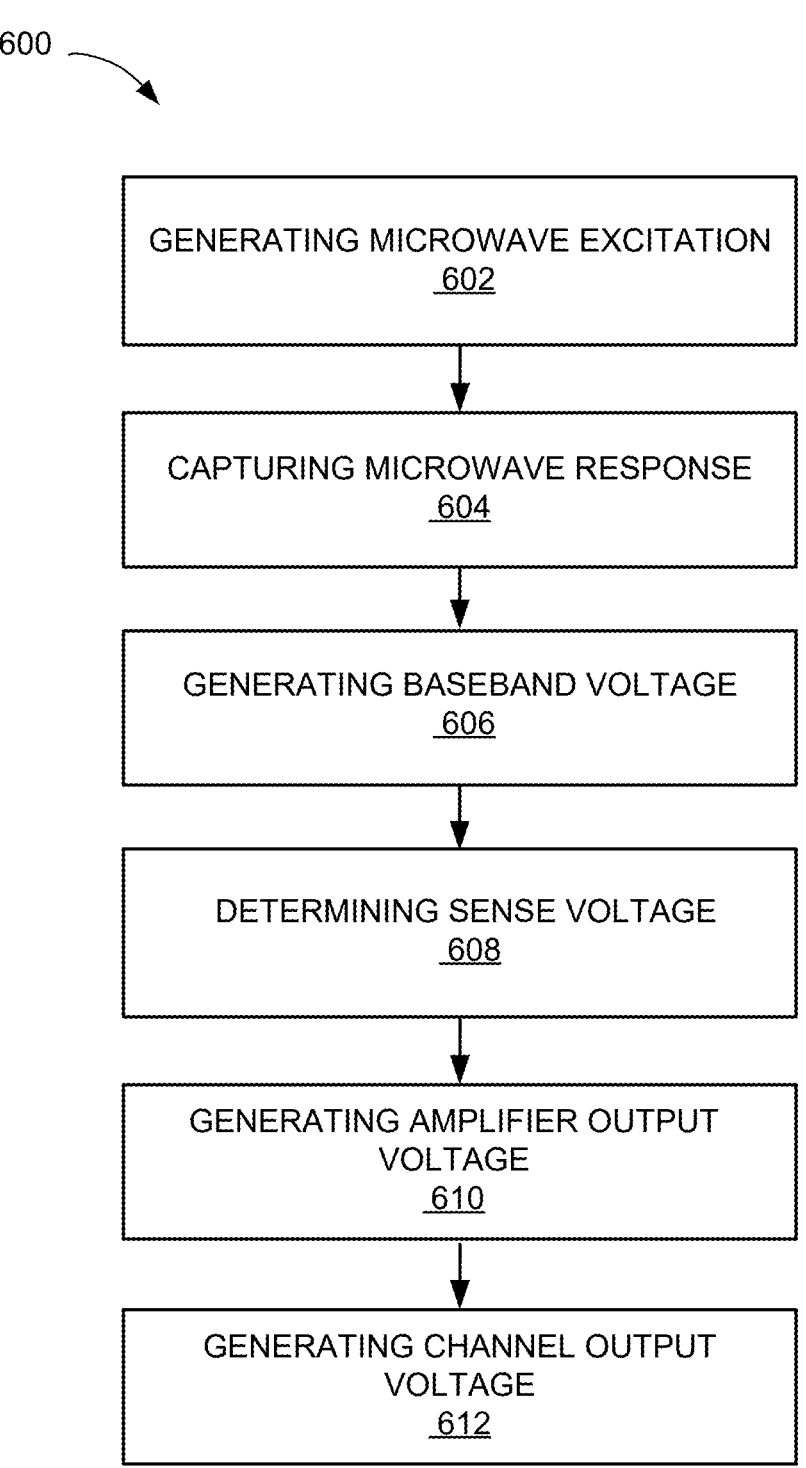
FIG. 6 is a flow chart of a method of operation of a measurement system in an embodiment of the present invention.

Referring now to FIG. 6, therein is shown a flow chart of a method 600 of operation of a measurement system 100 of FIG. 1 in an embodiment of the present invention. The method 600 includes: generating a microwave excitation to a sample in a block 602; capturing a microwave response from the sample based on the microwave excitation in a block 604; generating a baseband voltage based on the microwave response in a block 606; determining a sense voltage based on the baseband voltage in a block 608; generating an amplifier output voltage based on the sense voltage in a block 610; and generating a channel output voltage based on the amplifier output voltage in a frequency range from a direct-current (DC) value to a predefined frequency value for characterizing the sample in a block 612.

One or more embodiments provide a scanning microwave impedance microscopy (SMIM) system that utilizes both DC baseband and AC-modulated microwave excitation within a single hardware configuration. Prior SMIM implementations required complex cancellation circuits or separate setups for DC and AC operation, resulting in drift, limited resolution, and slower imaging. It has been unexpectedly discovered that combining a moderate-gain, low-noise amplifier with direct use of the RF baseband DC offset enables simultaneous DC and AC detection with a common sharp probe, providing high signal-to-noise ratio, drift-free operation, and quantitative impedance imaging for both contact and non-contact AFM modes in one instrument.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A measurement system comprising:
an excitation unit configured to generate a microwave excitation to a sample;
a probe, coupled to the excitation unit, configured to capture a microwave response from the sample based on the microwave excitation; and
an impedance detection unit, coupled to the probe, configured to:
generate a baseband voltage based on the microwave response,
determine a sense voltage based on the baseband voltage,
generate an amplifier output voltage based on the sense voltage, and
generate a channel output voltage based on the amplifier output voltage in a frequency range from a direct-current (DC) value to a predefined frequency value for characterizing the sample.

2. The measurement system as claimed in claim 1 wherein the impedance detection unit is configured to:
determine a common-mode voltage based on the sense voltage; and
remove the common-mode voltage from the amplifier output voltage.

3. The measurement system as claimed in claim 1 wherein the impedance detection unit is configured to:
determine the sense voltage including determining a first sense-node voltage based on the baseband voltage and a second sense-node voltage based on the baseband voltage; and
generate the channel output voltage including applying a gain factor to a difference of the first sense-node voltage and the second sense-node voltage.

4. The measurement system as claimed in claim 1 wherein the impedance detection unit is configured to:
determine the sense voltage including determining a first sense-node voltage based on the baseband voltage and a second sense-node voltage based on the baseband voltage;
determine a common-mode voltage based on an average of the first sense-node voltage and the second sense-node voltage; and
remove the common-mode voltage from the amplifier output voltage.

5. The measurement system as claimed in claim 1 wherein the impedance detection unit is configured to:
generate the baseband voltage including generating a first demodulation voltage based on the microwave response and a second demodulation voltage based on the microwave response; and
determine the sense voltage including determining a first sense-node voltage resistively coupled to the first demodulation voltage and a second sense-node voltage resistively coupled to the second demodulation voltage.

6. The measurement system as claimed in claim 1 wherein the impedance detection unit is configured to generate the channel output voltage by operating in an atomic force microscope (AFM) imaging mode including an approach-retract scan mode, an off-resonance tapping mode, a shear mode, a torsional mode, a current feedback mode, or a combination thereof.

7. The measurement system as claimed in claim 1 wherein:
the probe includes a metal-coated cantilever configured to capture the microwave response from the sample; and
the impedance detection unit is configured to generate the channel output voltage by operating in an atomic force microscope (AFM) probe mode including a contact mode, a non-contact mode, a tapping mode, or a combination thereof with the metal-coated cantilever.

8. A method of operation of a measurement system comprising:
generating a microwave excitation to a sample;
capturing a microwave response from the sample based on the microwave excitation;
generating a baseband voltage based on the microwave response;
determining a sense voltage based on the baseband voltage;
generating an amplifier output voltage based on the sense voltage; and
generating a channel output voltage based on the amplifier output voltage in a frequency range from a direct-current (DC) value to a predefined frequency value for characterizing the sample.

9. The method as claimed in claim 8 further comprising:
determining a common-mode voltage based on the sense voltage; and
removing the common-mode voltage from the amplifier output voltage.

10. The method as claimed in claim 8 wherein:
determining the sense voltage includes determining a first sense-node voltage based on the baseband voltage and a second sense-node voltage based on the baseband voltage; and
generating the channel output voltage includes applying a gain factor to a difference of the first sense-node voltage and the second sense-node voltage.

11. The method as claimed in claim 8 wherein:
determining the sense voltage includes determining a first sense-node voltage based on the baseband voltage and a second sense-node voltage based on the baseband voltage;
further comprising:
determining a common-mode voltage based on an average of the first sense-node voltage and the second sense-node voltage; and
removing the common-mode voltage from the amplifier output voltage.

12. The method as claimed in claim 8 wherein:
generating the baseband voltage includes generating a first demodulation voltage based on the microwave response and a second demodulation voltage based on the microwave response; and determining the sense voltage includes determining a first sense-node voltage resistively coupled to the first demodulation voltage and a second sense-node voltage resistively coupled to the second demodulation voltage.

13. The method as claimed in claim 8 wherein generating the channel output voltage includes generating the channel output voltage by operating in an atomic force microscope (AFM) imaging mode including an approach-retract scan mode, an off-resonance tapping mode, a shear mode, a torsional mode, a current feedback mode, or a combination thereof.

14. The method as claimed in claim 8 wherein:
capturing the microwave response includes capturing, with a metal-coated cantilever, the microwave response from the sample; and
generating the channel output voltage includes generating the channel output voltage by operating in an atomic force microscope (AFM) probe mode including a contact mode, a non-contact mode, a tapping mode, or a combination thereof with the metal-coated cantilever.

15. A non-transitory computer-readable medium storing an instruction that, when executed by a control circuit of a measurement system, causes the control circuit to perform functions comprising:
generating a microwave excitation to a sample;
capturing a microwave response from the sample based on the microwave excitation;
generating a baseband voltage based on the microwave response;
determining a sense voltage based on the baseband voltage;
generating an amplifier output voltage based on the sense voltage; and
generating a channel output voltage based on the amplifier output voltage in a frequency range from a direct-current (DC) value to a predefined frequency value for characterizing the sample.

16. The non-transitory computer-readable medium as claimed in claim 15 further comprising:
determining a common-mode voltage based on the sense voltage; and removing the common-mode voltage from the amplifier output voltage.

17. The non-transitory computer-readable medium as claimed in claim 15 wherein:
determining the sense voltage includes determining a first sense-node voltage based on the baseband voltage and a second sense-node voltage based on the baseband voltage; and
generating the channel output voltage includes applying a gain factor to a difference of the first sense-node voltage and the second sense-node voltage.

18. The non-transitory computer-readable medium as claimed in claim 15 wherein:
determining the sense voltage includes determining a first sense-node voltage based on the baseband voltage and a second sense-node voltage based on the baseband voltage;
further comprising:
determining a common-mode voltage based on an average of the first sense-node voltage and the second sense-node voltage; and
removing the common-mode voltage from the amplifier output voltage.

19. The non-transitory computer-readable medium as claimed in claim 15 wherein:
generating the baseband voltage includes generating a first demodulation voltage based on the microwave response and a second demodulation voltage based on the microwave response; and
determining the sense voltage includes determining a first sense-node voltage resistively coupled to the first demodulation voltage and a second sense-node voltage resistively coupled to the second demodulation voltage.

20. The non-transitory computer-readable medium as claimed in claim 15 wherein generating the channel output voltage includes generating the channel output voltage by operating in an atomic force microscope (AFM) imaging mode including an approach-retract scan mode, an off-resonance tapping mode, a shear mode, a torsional mode, a current feedback mode, or a combination thereof.

* * * * *